United States Patent [19]
Weber

[11] 3,978,828
[45] *Sept. 7, 1976

[54] V-TYPE INTERNAL COMBUSTION ENGINE

[75] Inventor: Robert L. Weber, Lacon, Ill.

[73] Assignee: Caterpillar Tractor Co., Peoria, Ill.

[ * ] Notice: The portion of the term of this patent subsequent to June 7, 1991, has been disclaimed.

[22] Filed: Aug. 14, 1972

[21] Appl. No.: 280,576

[52] U.S. Cl. ............................................. 123/55 VE
[51] Int. Cl.² ......................................... F02B 75/22
[58] Field of Search ..... 123/55 VE, 197 AC, 192 B, 123/55 V; 74/603, 596

[56] References Cited
UNITED STATES PATENTS

| | | | |
|---|---|---|---|
| 2,632,340 | 3/1953 | Dolza et al. .................... | 123/55 VE |
| 2,680,427 | 6/1954 | Summers ......................... | 123/55 VE |
| 3,116,724 | 1/1964 | Elger et al. ....................... | 123/55 V |
| 3,308,680 | 3/1967 | Sherrick .......................... | 123/55 VE |

Primary Examiner—Carlton R. Croyle
Assistant Examiner—Louis J. Casaregola
Attorney, Agent, or Firm—Phillips, Moore, Weissenberger, Lempio & Strabala

[57] ABSTRACT

A V-8 internal combustion engine has its two cylinder banks disposed at an included angle of 65° and each adjacent pair of crankpins of a two-plane, counterweighted crankshaft displaced at an angle of 25° with respect to each other. Sharp edges initially formed at diametrically opposed intersections of each pair of crankpins are ground-off to form an S-shaped blended surface area thereat for reducing stress concentrations.

2 Claims, 8 Drawing Figures

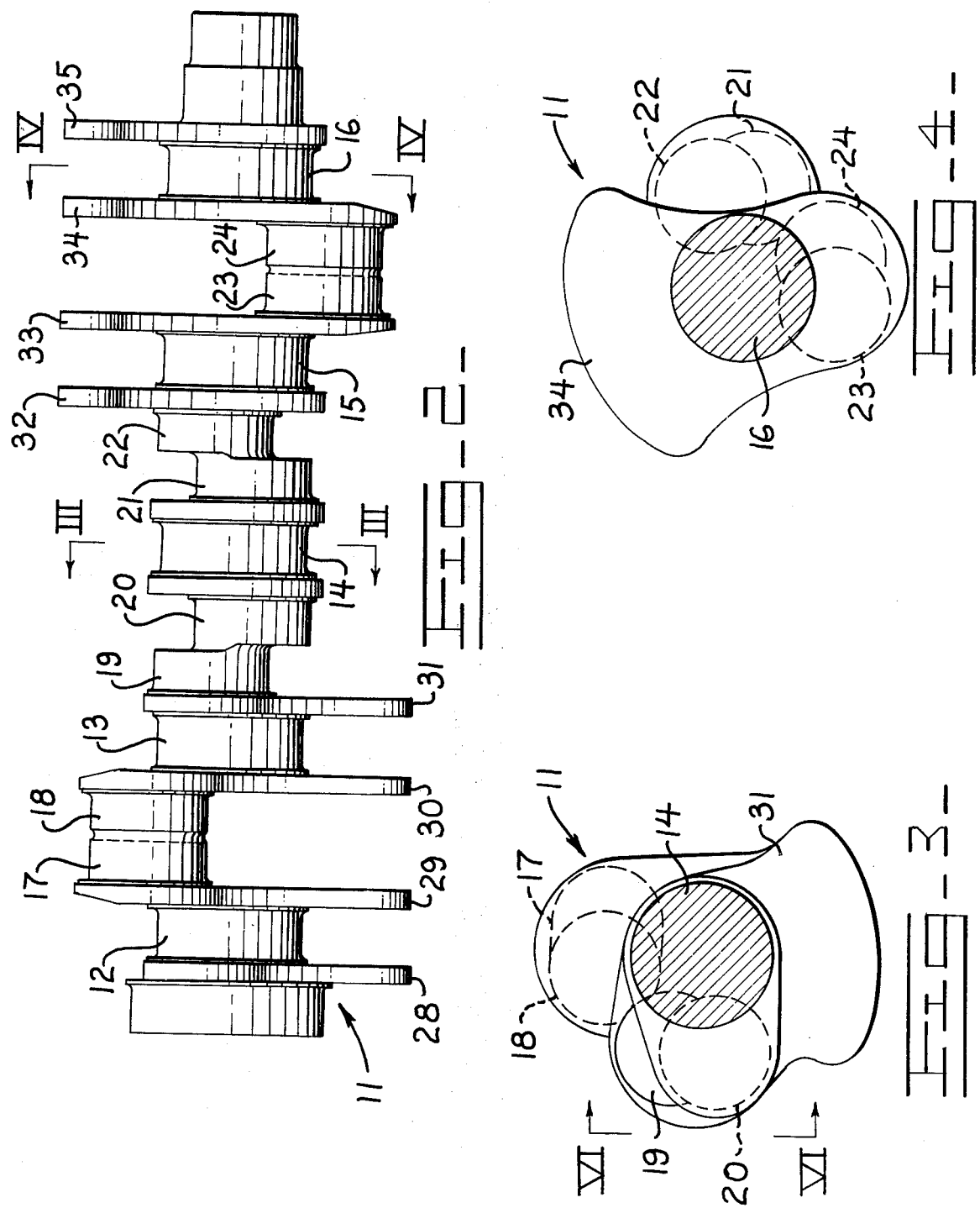

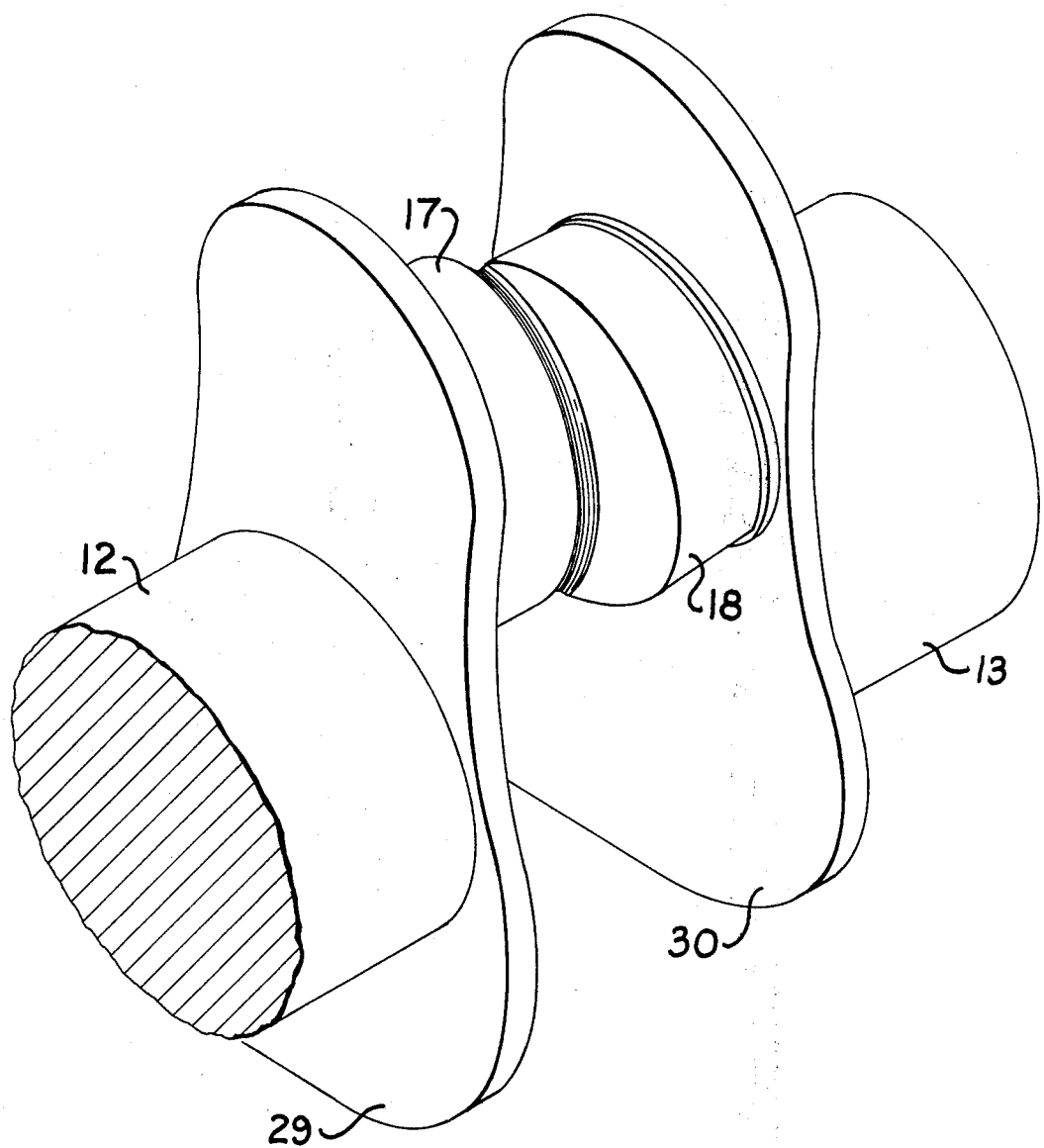

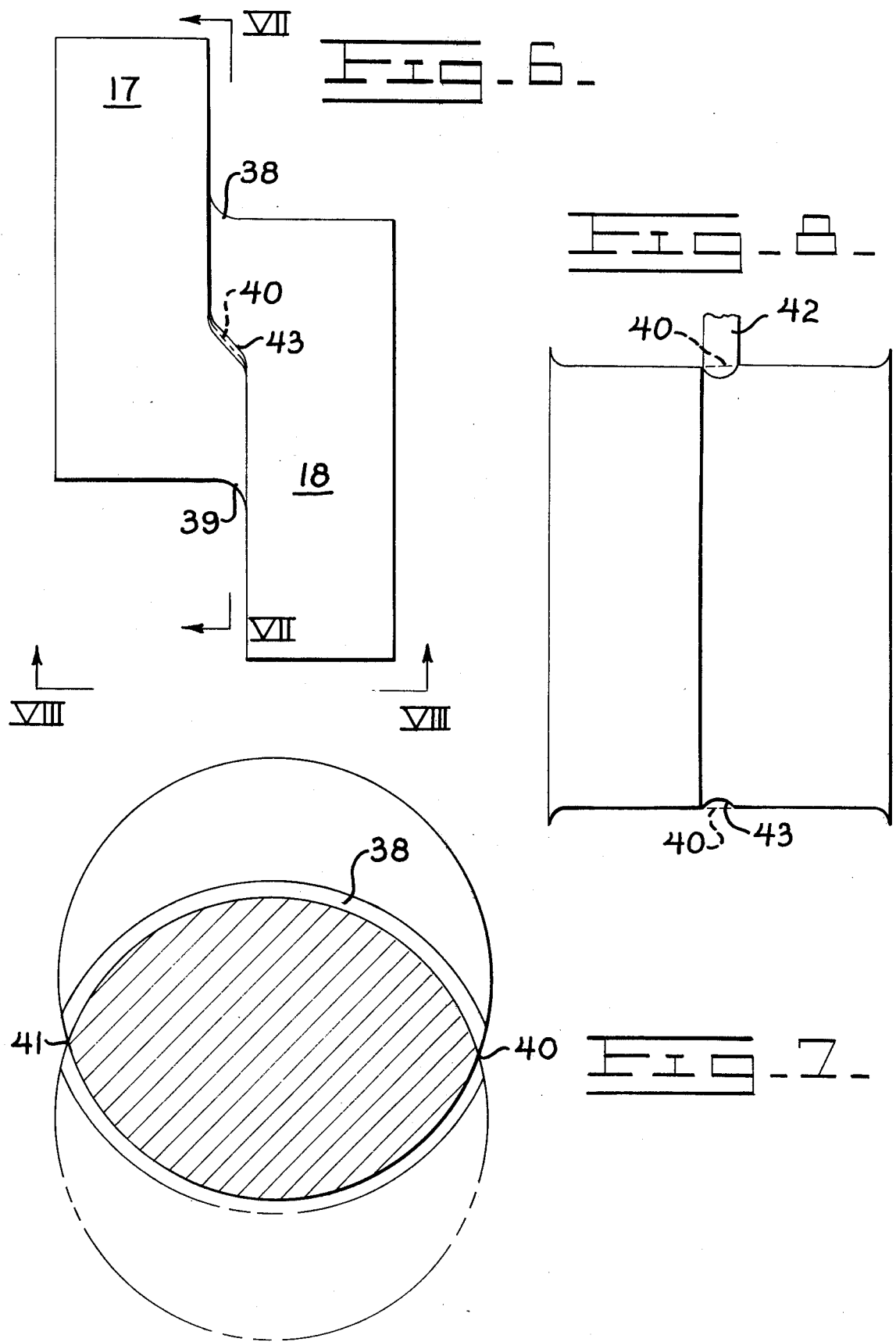

V-TYPE INTERNAL COMBUSTION ENGINE

BACKGROUND OF THE INVENTION

Many conventional V-type engines, having their cylinder banks disposed at an included angle of 60° normally utilize a single plane crankshaft whereby all the crankshaft throws are produced in a single plane. Such crankshafts dictate the use of an odd firing ignition angle between the cylinders, i.e., combustion between two cylinders takes place at 60° with sequential pauses of 120° occuring before the next two cylinders fire. Such combustion sequence is commonly referred to as an odd fire pattern which creates undesirable second order vibrations normally requiring the use of relatively large, compensating flywheels which tend to lower engine performance. Unbalance conditions prevalent in the engine are normally counteracted by the use of conventional balancers.

It is conventional practice to counteract second order vibrations to obtain substantially even firing by offsetting adjacent crankshaft pins at 30°. Shaking forces are counteracted by employing suitably disposed counterbalance shafts driven by the crankshaft. Adequate crankpin bearing area is normally obtained by providing them with sufficiently large diameters. Such large crankpin diameters increase the piston connecting rod large end whereby conventional piston rods must be replaced by relatively expensive split angle piston rods which are more difficult to install and service. In addition, each adjacent pair of such crankpins include highly stressed areas at their filleted intersections. U.S. Pat. Nos. 2,632,340; 2,680,427; 3,116,724; and 3,308,680 disclose prior art engines of the type discussed above.

SUMMARY OF THE INVENTION

An object of this invention is to overcome the above, briefly described problems by providing a substantially balanced crankshaft for a series of compact V-type engines (V-8, V-12, V-16, etc.) wherein the cylinder banks are disposed at an included angle of 65° and each adjacent pair of crankpins are offset at an angle of 25°. Another feature of this invention comprises a method for relieving stresses normally occurring at the filleted intersection of each adjacent pair of crankpins by forming diametrically opposed and S-shaped stress relieving blend areas thereat.

BRIEF DESCRIPTION OF THE DRAWINGS

Other objects of this invention will become apparent from the following description and accompanying drawings wherein:

FIG. 2 is a side elevational view of a substantially balanced crankshaft employed in such engine;

FIGS. 3 and 4 are sectional views taken in the direction of arrows III—III and IV—IV, respectively, in FIG. 2;

FIG. 5 is an enlarged, isometric view of a portion of the crankshaft;

FIG. 6 is an enlarged side elevational view of an adjacent pair of crankpins;

FIG. 7 is a sectional view taken in the direction of arrows VII—VII in FIG. 6; and FIG. 8 is a bottom plan view of the crankpins, taken in the direction of arrows VIII—VIII in FIG. 6.

DETAILED DESCRIPTION

Figure 1:
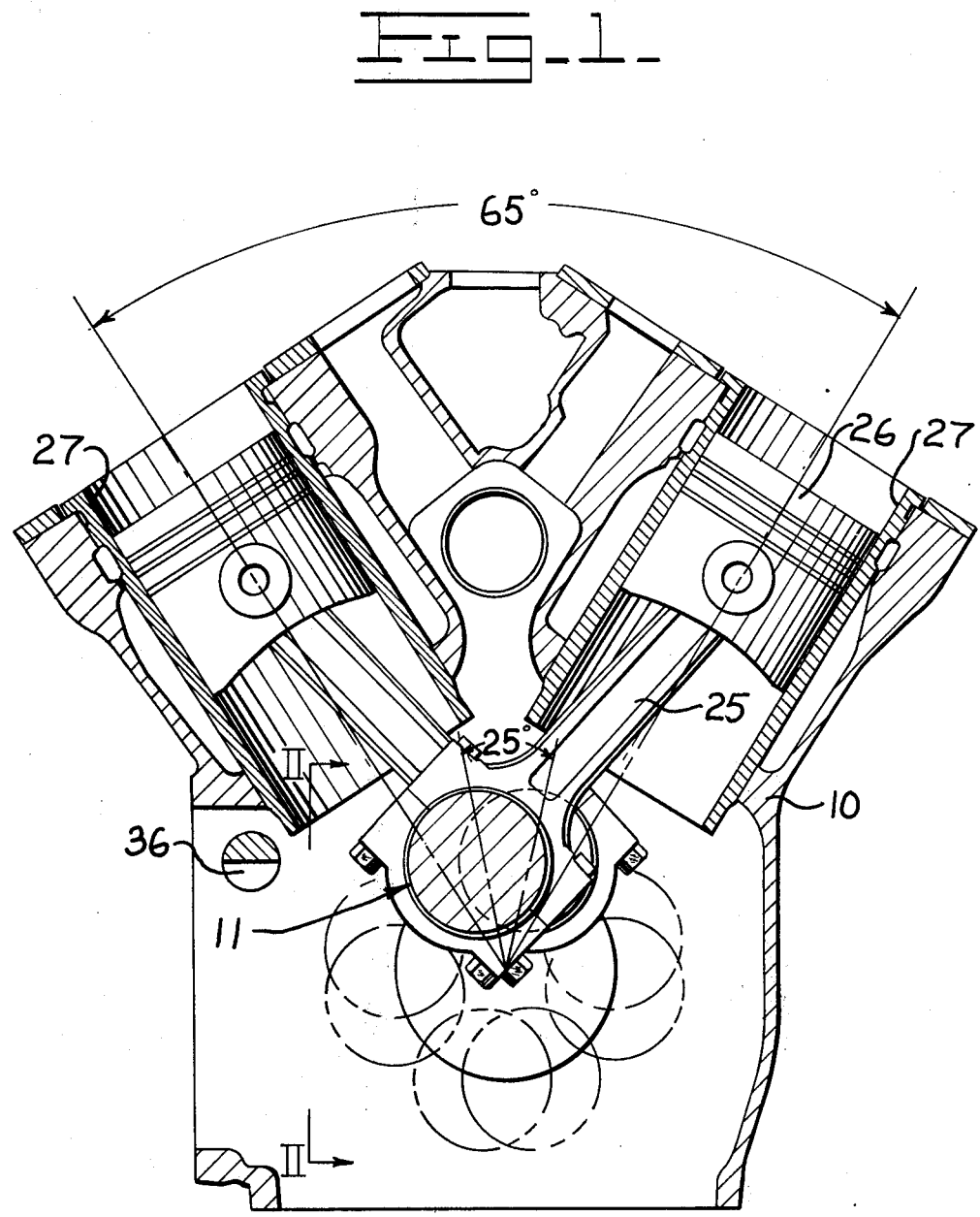
FIG. 1 is a transverse section through a V-8 internal combustion engine embodying this invention.

FIG. 1 illustrates a V-8 (or V-12, V-16, etc.) internal combustion engine comprising a cylinder block 10 having a two-plane crankshaft 11 rotatably mounted therein by five longitudinally aligned main bearing journals 12 through 16 (FIG. 2). The crankshaft further comprises crankpins or throws 17 through 24, each having a rod 25 and a piston 26 suitably attached thereto in a conventional manner. Each piston is reciprocally mounted in a cylinder 27 with the two banks of four cylinders being disposed at an included angle of 65°. As further illustrated in FIG. 1, each adjacent pair of crankpins 17–18, 19–20, 21–22 and 23–24 are offset at an angle of 25° relative to each other.

As shown in FIGS. 2–4, pairs of counterweights 28–29, 30–31, 32–33 and 34–35 are secured to the crankshaft on each side of the four outer main bearing journals 12, 13, 15 and 16, respectively, to counteract unbalanced forces arising during engine operation. As further shown in FIG. 1, balancer shaft 36 may be rotatably mounted on the engine in the engine block and driven by the crankshaft by gear means (not shown) for balancing primary coupling forces in a conventional manner.

Referring to FIGS. 5–8, offset crankpins 17 and 18, for example, have a generally elliptically shaped overlapped area, shown by cross sectional lines in FIG. 7. Such area preferably constitutes at least one-third of the combined cross sectional areas of the two crankpins. The two crankpins intersect at a pair of fillets 38 and 39, each of which extends circumferentially approximately 145° about a respective crankpin.

Relatively sharp edges, shown by dotted lines 40 and 41, are formed during fabrication of the crankshaft. Such edges give rise to undue stress concentrations thereat which could produce fractures during engine operation, substantially shortening the life expectancy of the crankshaft.

The method of this invention comprises the employment of a cutting tool 42 (FIG. 8) or a grinding wheel, disposed at a predetermined radius R from the centerline of the overlapped crankpins, for removing sharp edges 40 and 41 from the formed crankshaft described above. Diametrically opposed S-shaped blended surface areas 43 are thus formed at the two circumferentially disposed intersections of fillets 38 and 39.

What is claimed is:

1. A V-type internal combustion engine comprising a cylinder block having two banks of cylinders disposed at an included angle of 65° with respect to each, a crankshaft having a plurality of longitudinally aligned main bearing journals rotatably mounting said crankshaft in said block and pairs of crankpins with the crankpins of each such pair being overlapped and offset at an angle of 25° with respect to each other, each pair of crankpins positioned between an adjacent pair of main bearing journals and having an overlapped integrally connected area which is at least one-third of the combined areas of such pair of crankpins, said crankpins intersecting at a pair of fillets, each extending circumferentially approximately 145° about a respective crankpin with diametrically opposed S-shaped blended surface areas formed at two circumferentially disposed intersections of said fillets, a rod mounted on each of said crankpins, and a piston connected to each one of said rods and reciprocally mounted in a respective one of said cylinders, and a plurality of counterweights secured to said crankshaft disposed solely on each side of four outer ones of said main bearing journals.

2. The invention of claim 1 wherein said engine constitutes four cylinders in each bank thereof and wherein said crankshaft constitutes five main bearing journals and four of said pairs of crankpins.

* * * * *